Figure 1:
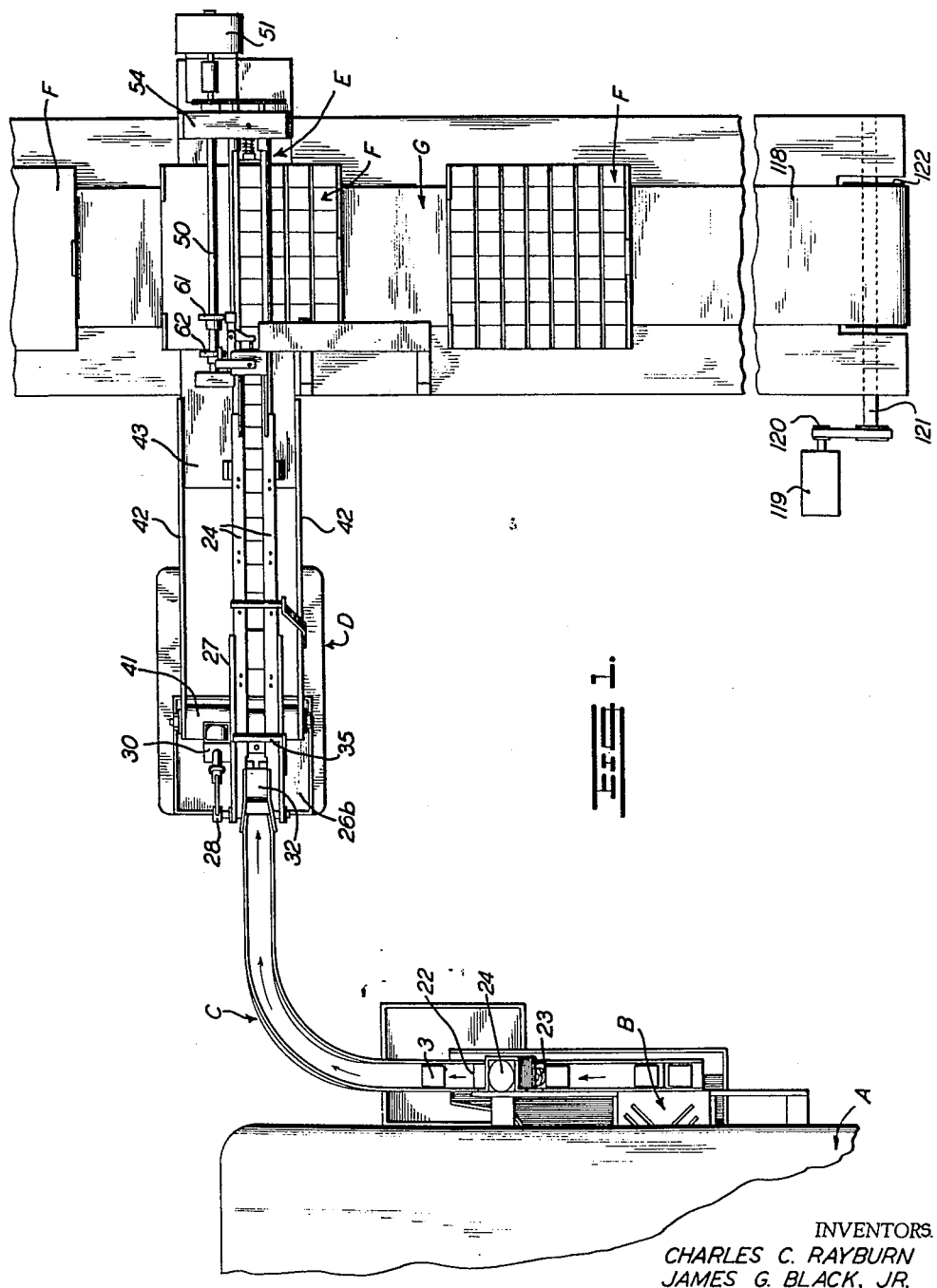

March 27, 1962 C. C. RAYBURN ETAL 3,026,990
FEEDING AND LOADING APPARATUS
Filed Nov. 16, 1959 16 Sheets-Sheet 1

INVENTORS.
CHARLES C. RAYBURN
JAMES G. BLACK, JR.

BY William A. Ryan
ATTORNEY

INVENTORS.
CHARLES C. RAYBURN
JAMES G. BLACK, JR.

BY William A. Ryan
ATTORNEY

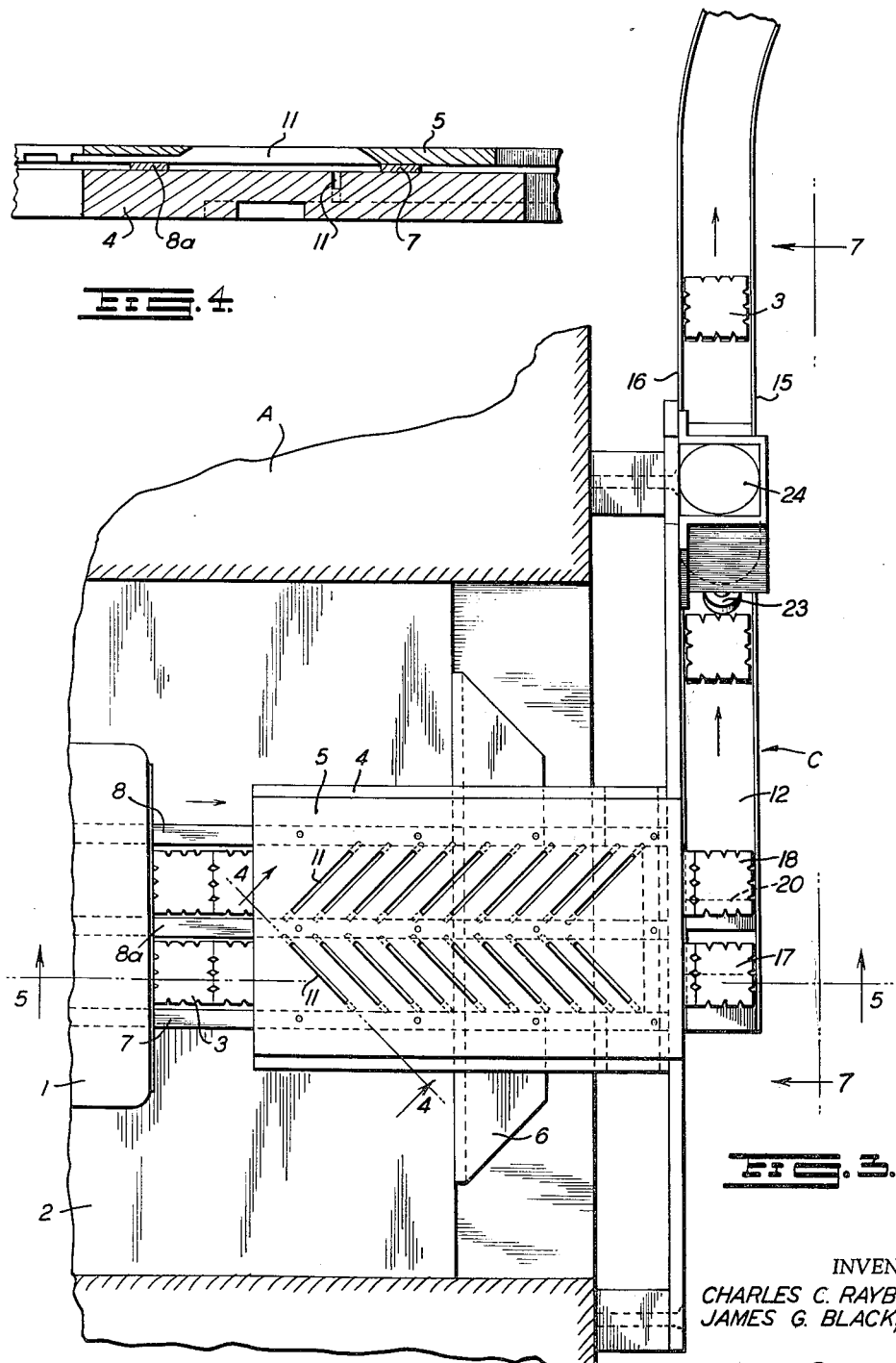

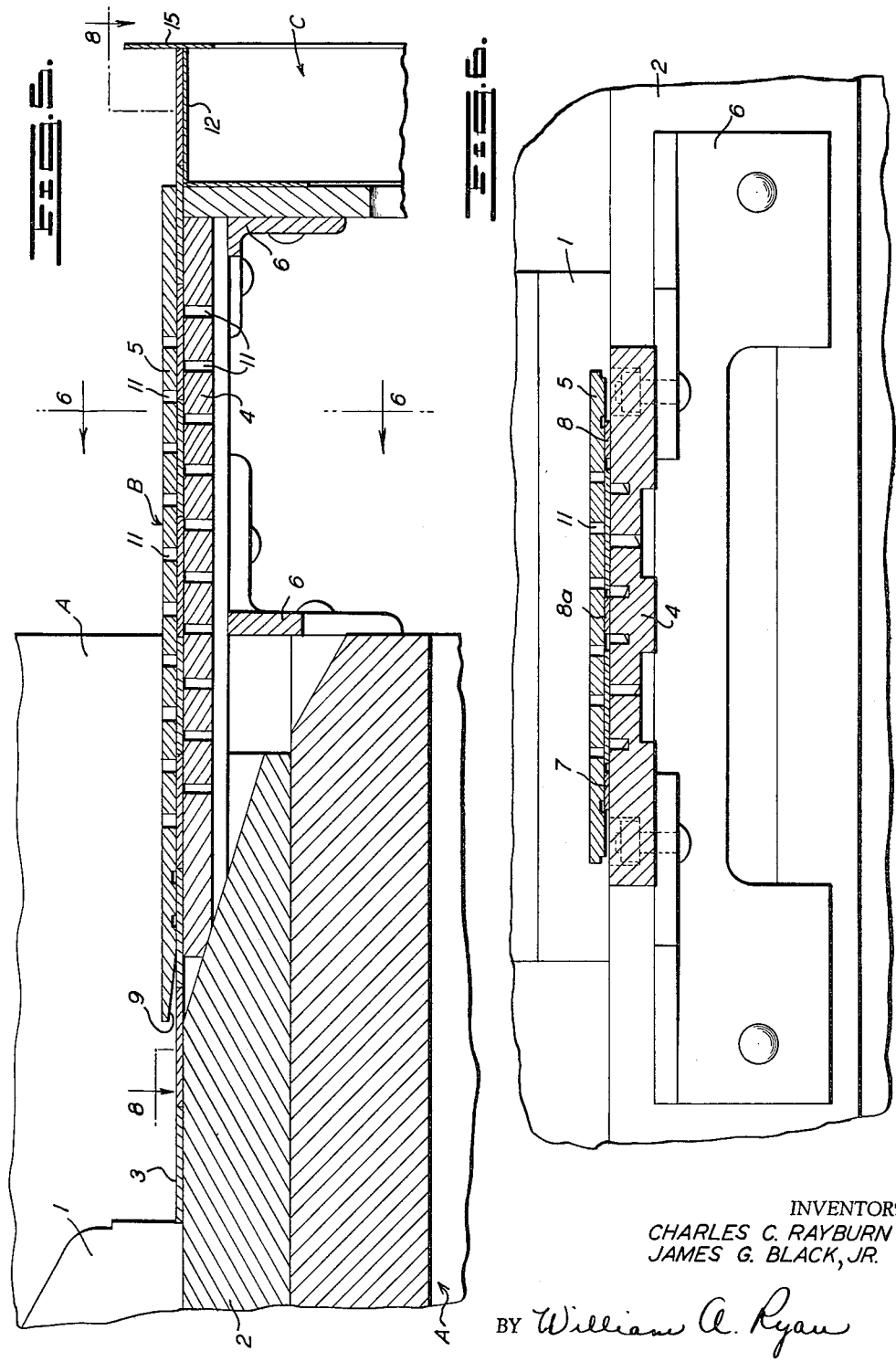

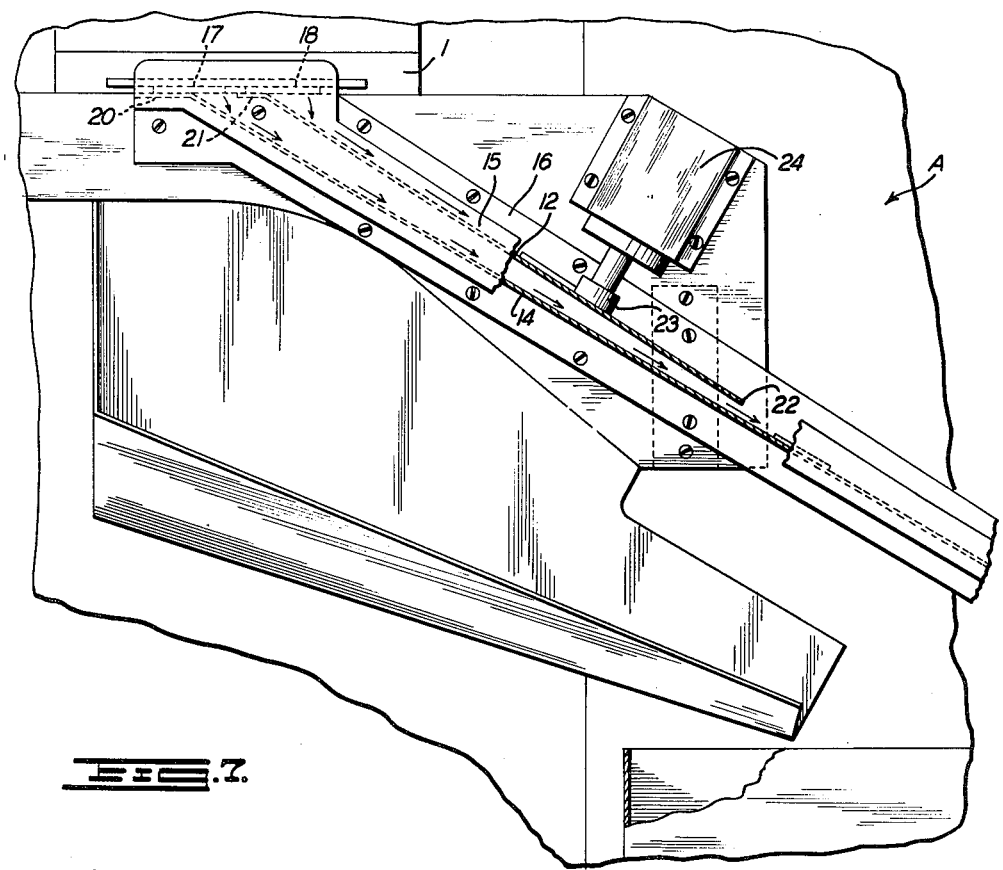
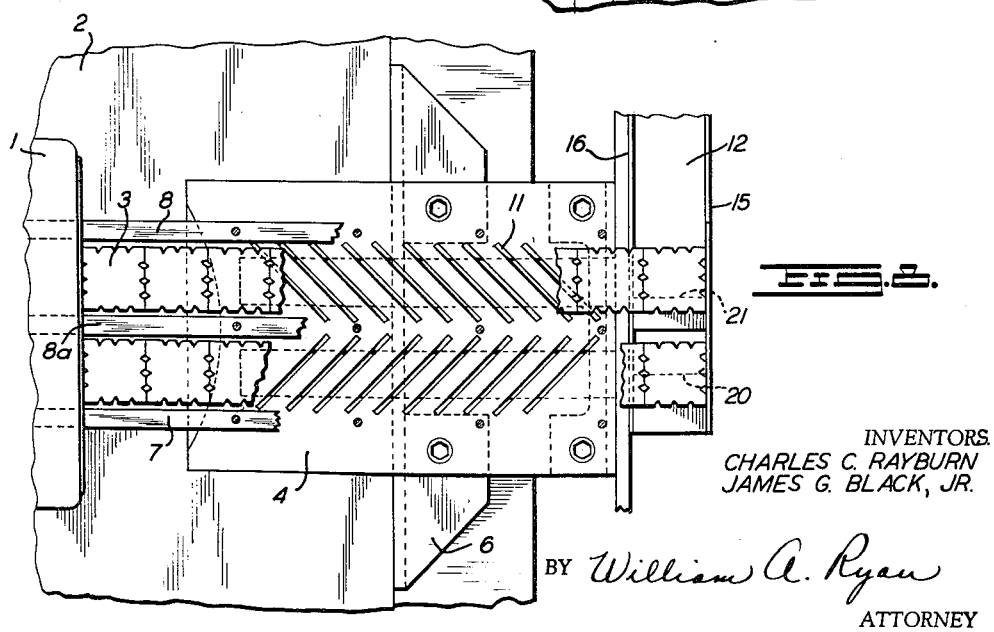

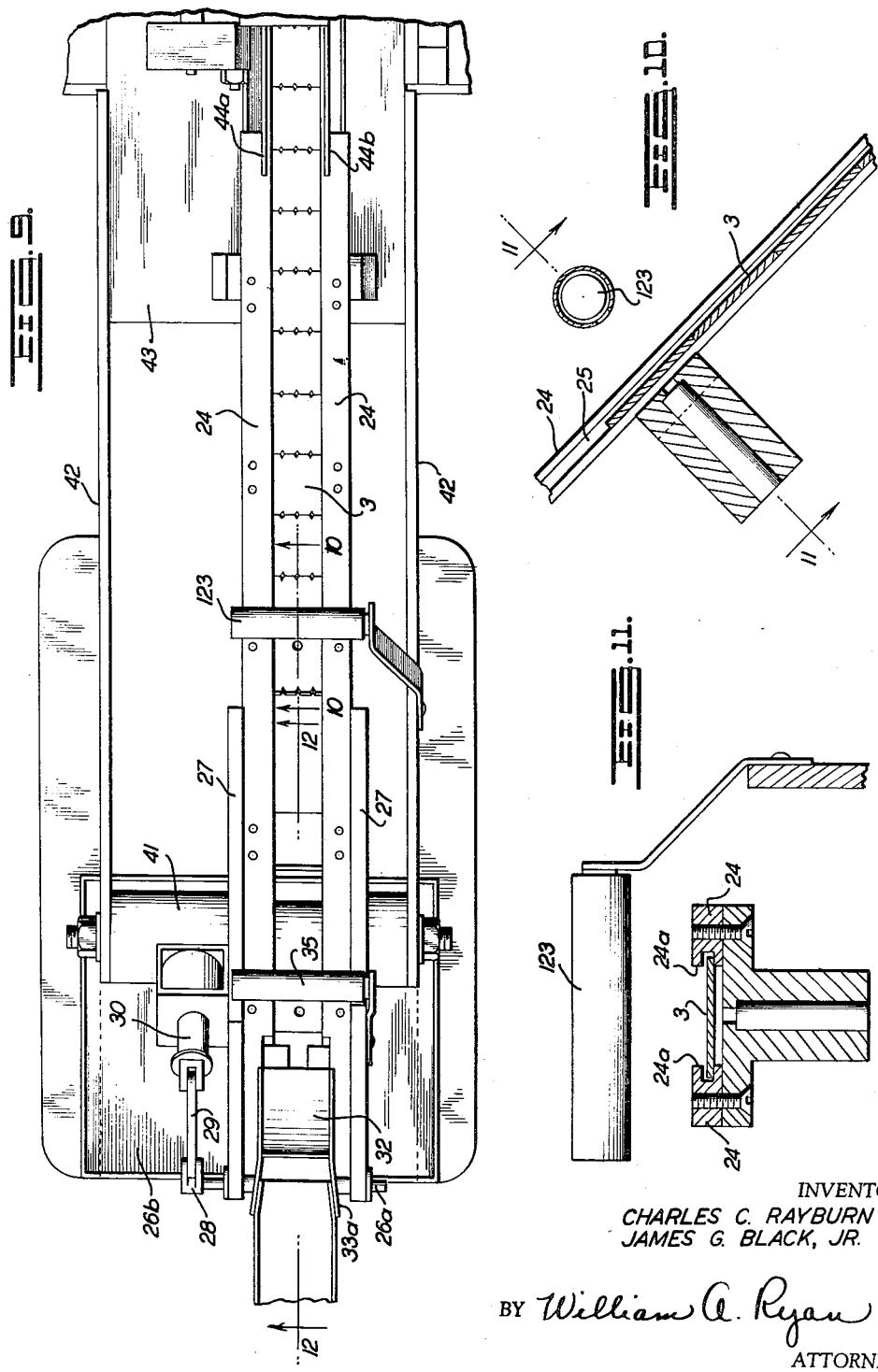

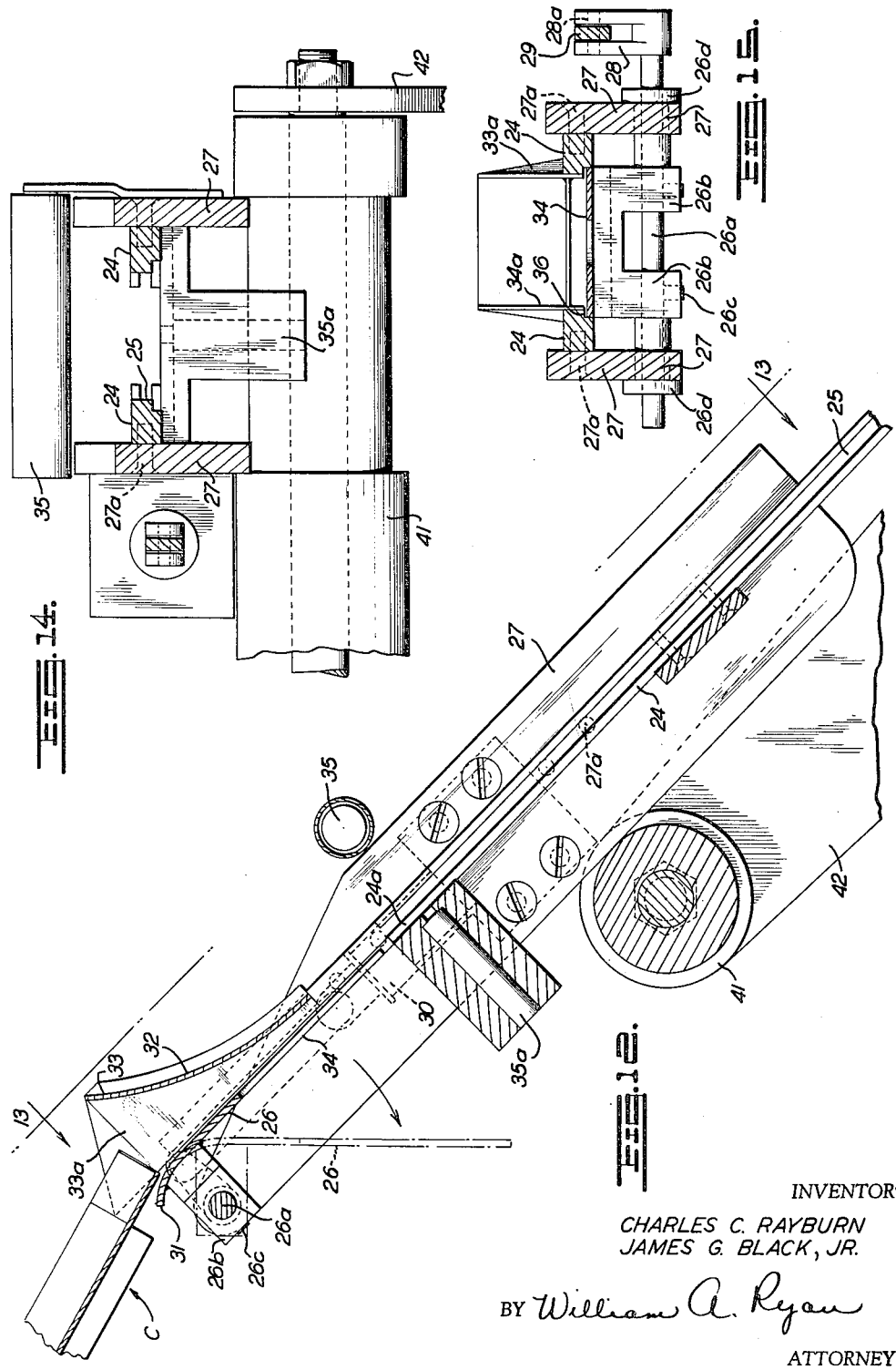

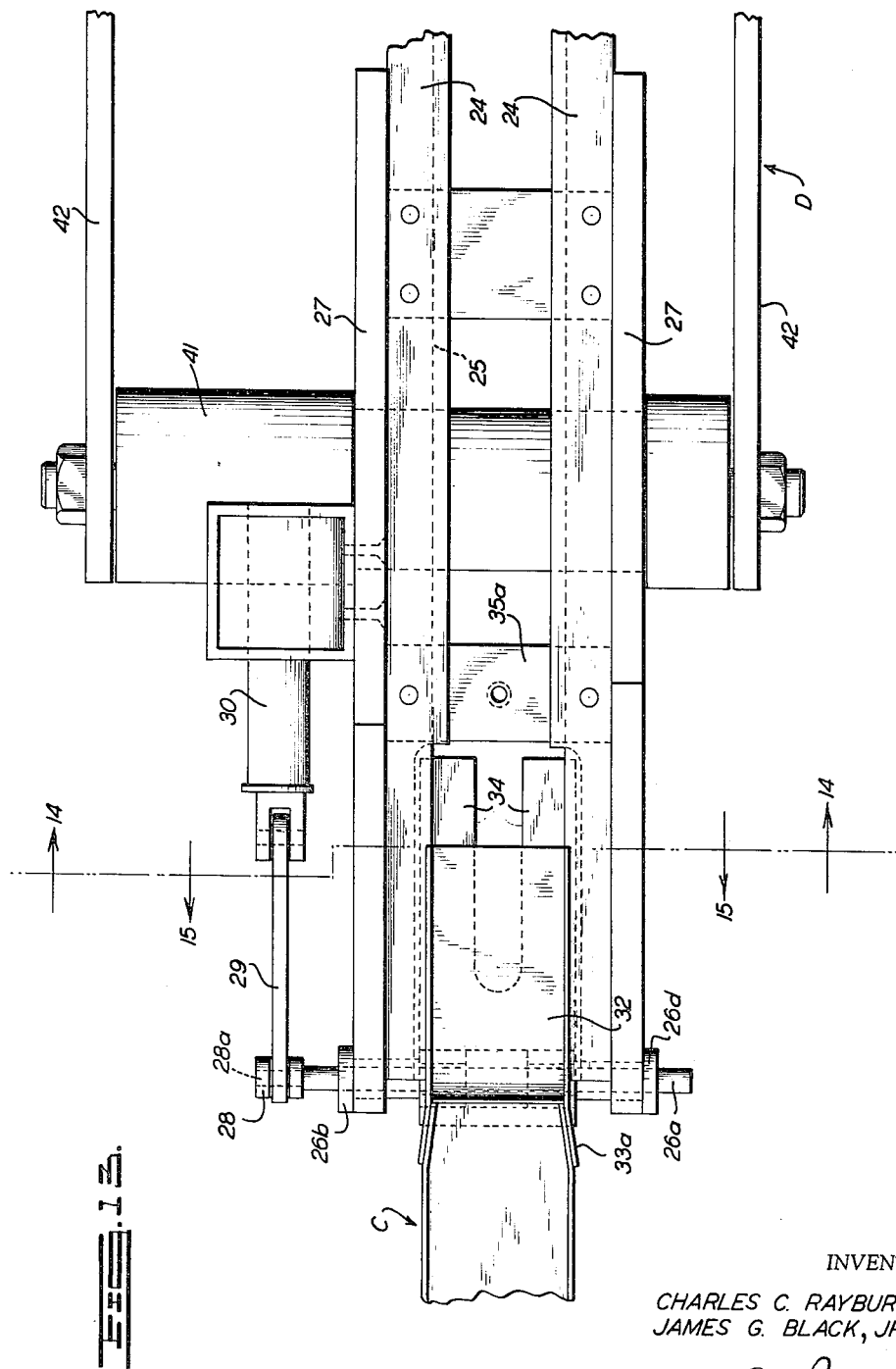

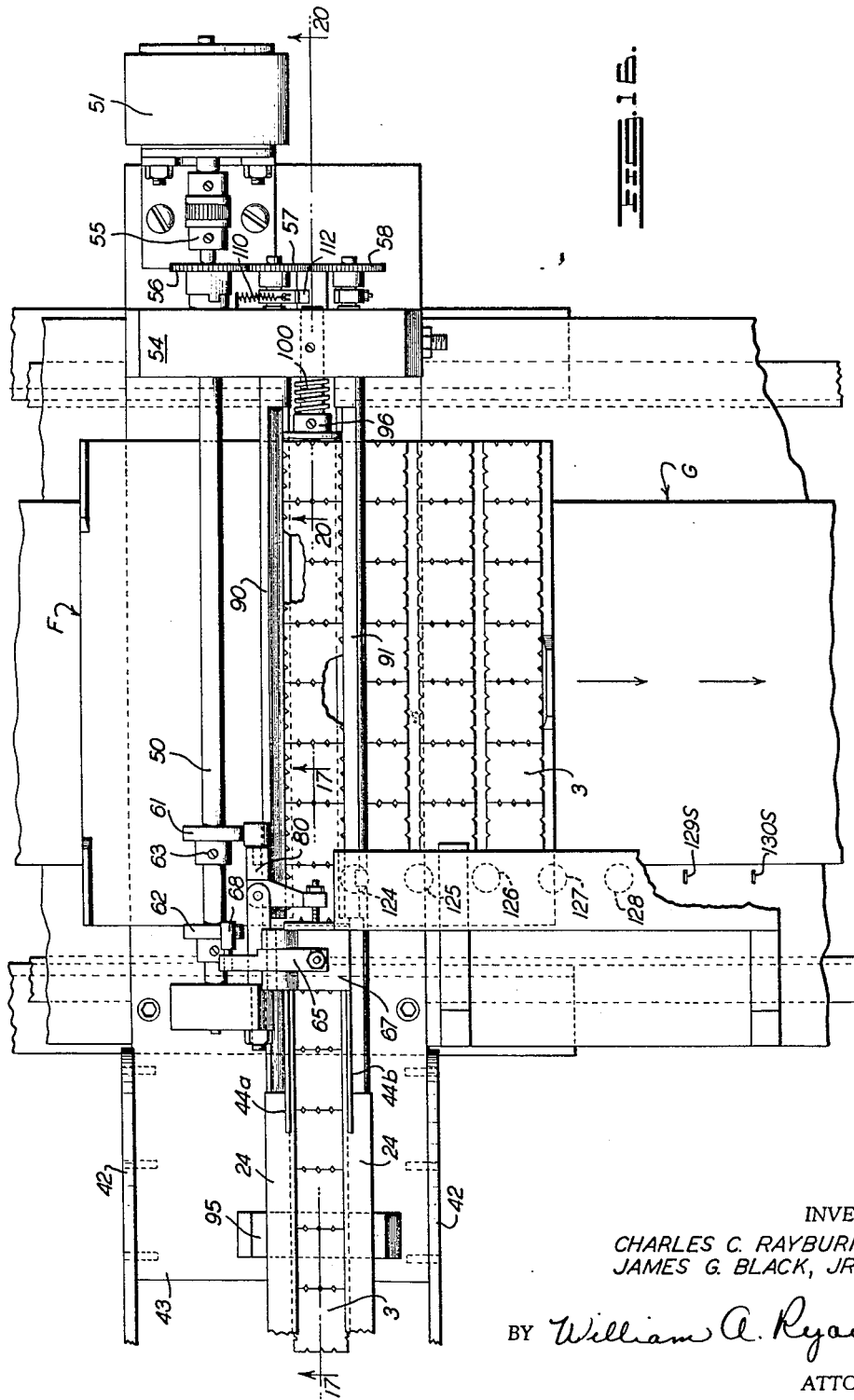

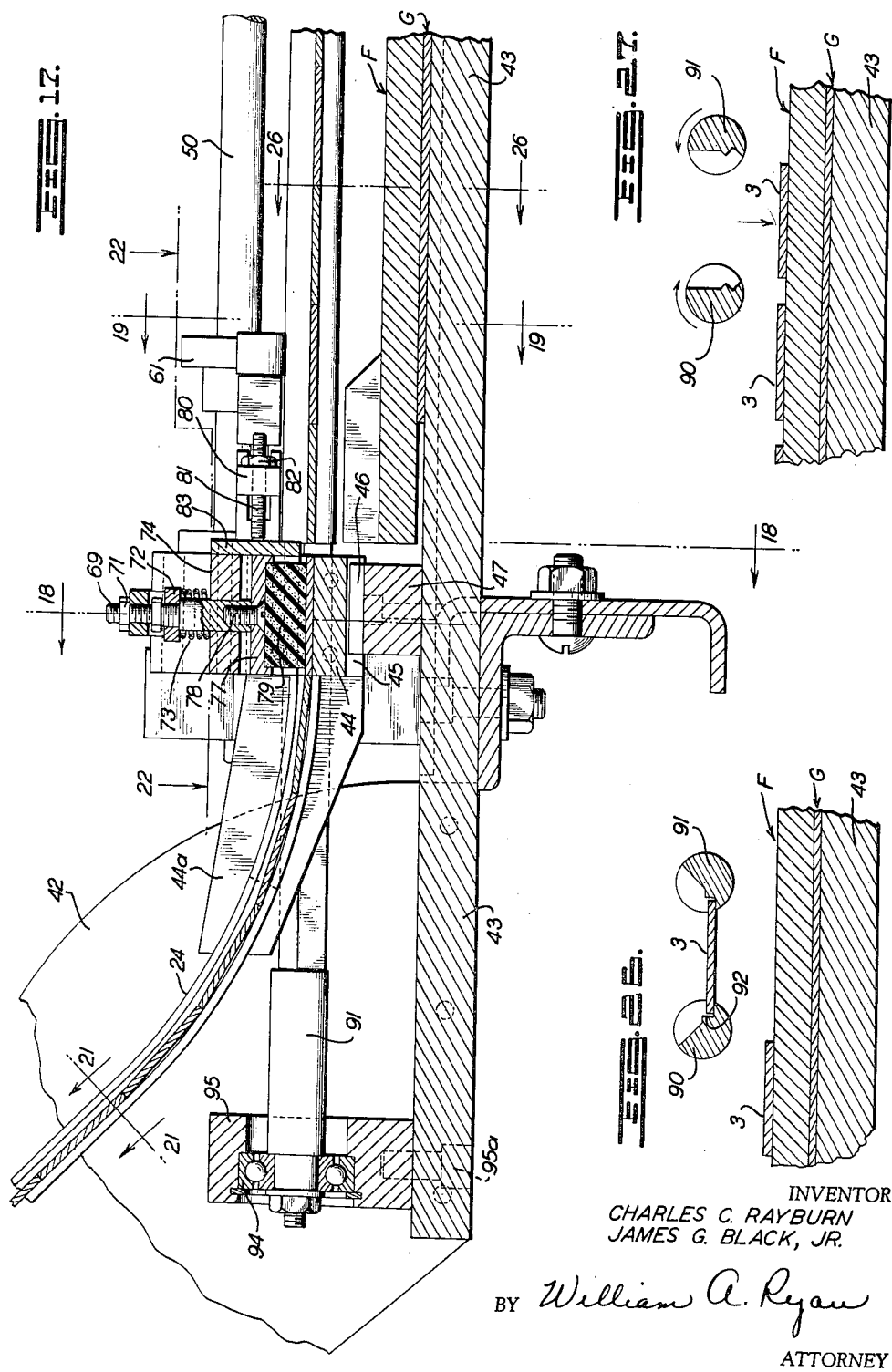
March 27, 1962 — C. C. RAYBURN ETAL — 3,026,990
FEEDING AND LOADING APPARATUS
Filed Nov. 16, 1959 — 16 Sheets-Sheet 10
INVENTORS.
CHARLES C. RAYBURN
JAMES G. BLACK, JR.
BY William A. Ryan
ATTORNEY March 27, 1962  C. C. RAYBURN ETAL  3,026,990
FEEDING AND LOADING APPARATUS
Filed Nov. 16, 1959  16 Sheets-Sheet 11

INVENTORS
CHARLES C. RAYBURN
JAMES G. BLACK, JR.

BY William A. Ryan
ATTORNEY

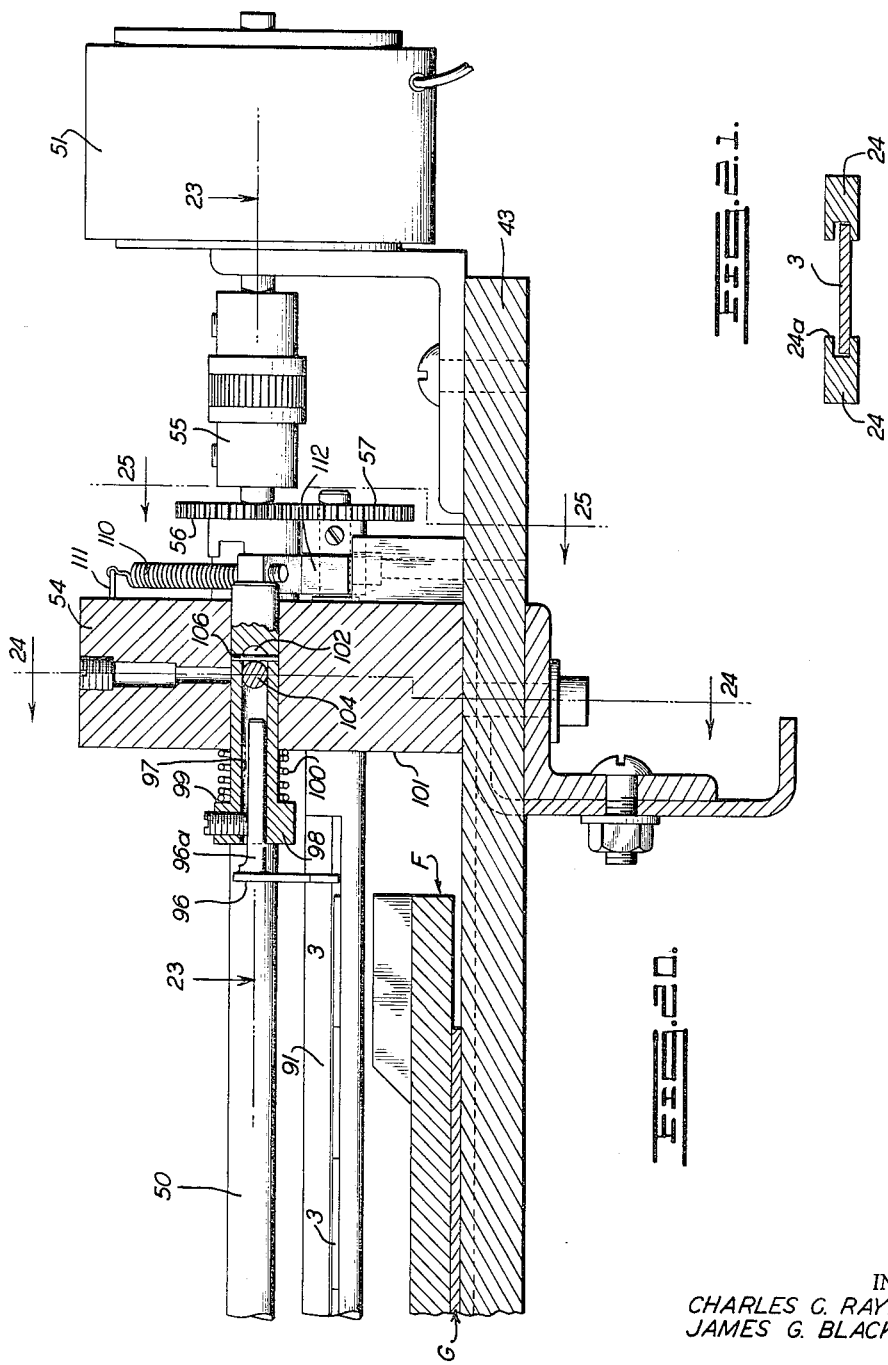

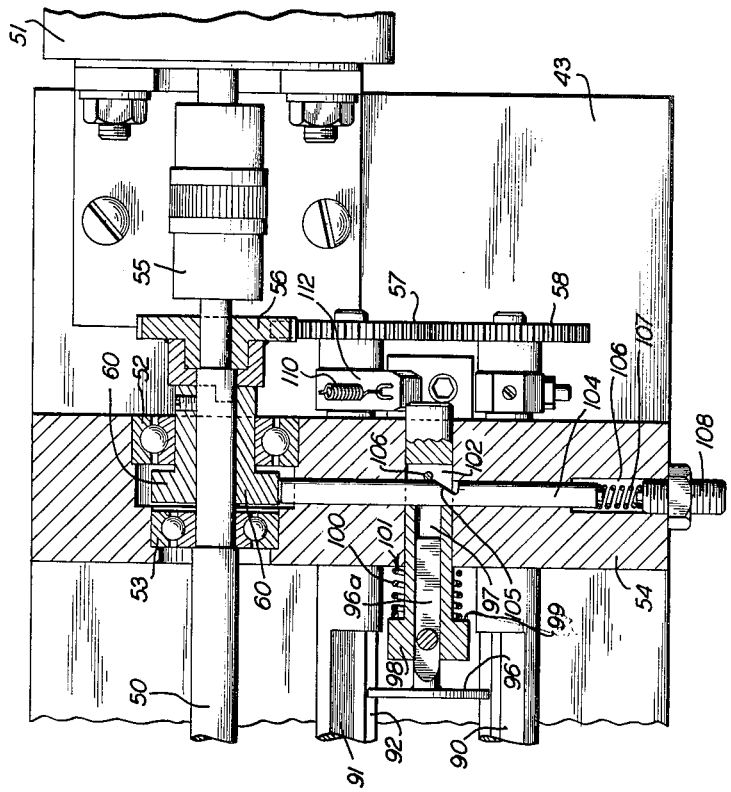
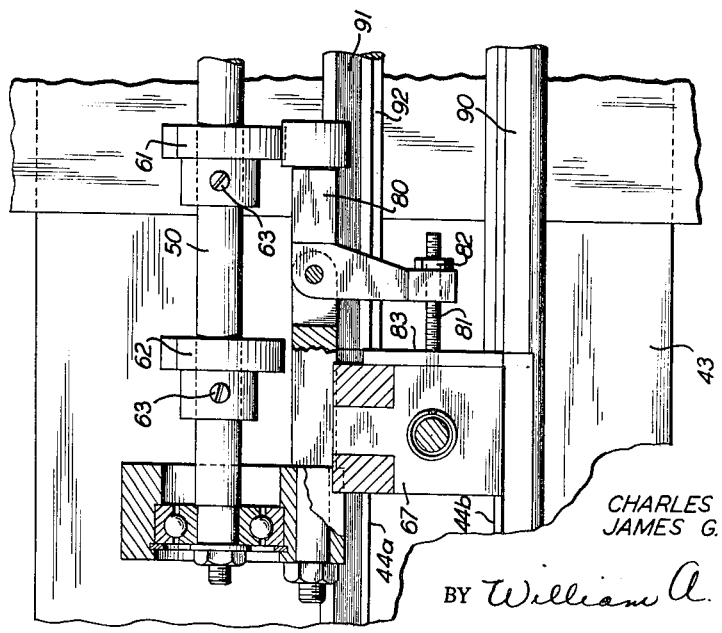

INVENTORS.
CHARLES C. RAYBURN
JAMES G. BLACK, JR.
BY William A. Ryan
ATTORNEY

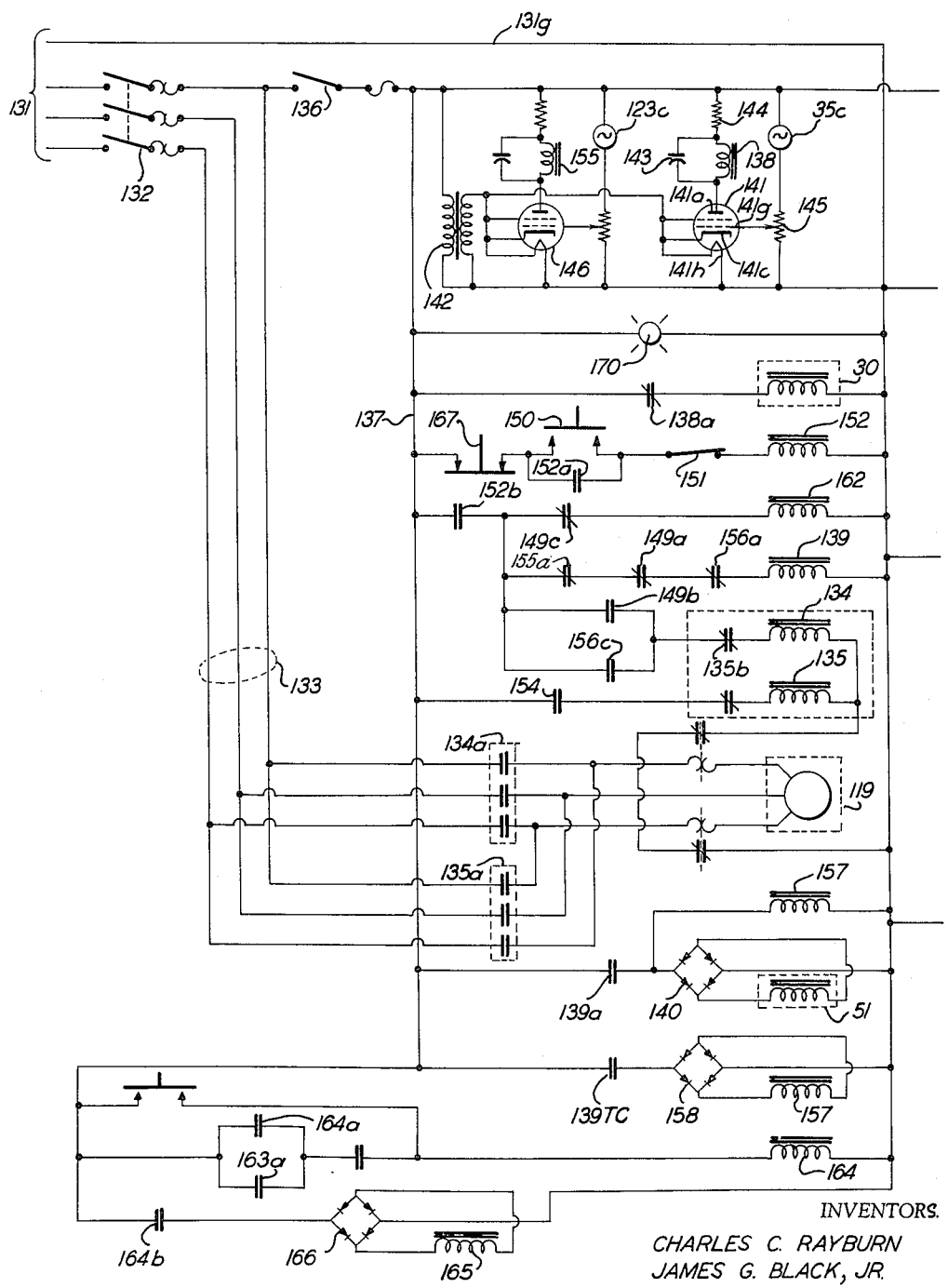

March 27, 1962  C. C. RAYBURN ETAL  3,026,990
FEEDING AND LOADING APPARATUS
Filed Nov. 16, 1959  16 Sheets-Sheet 16

INVENTORS.
CHARLES C. RAYBURN
JAMES G. BLACK, JR.
BY William A. Ryan
ATTORNEY

United States Patent Office 3,026,990
Patented Mar. 27, 1962

3,026,990
FEEDING AND LOADING APPARATUS
Charles C. Rayburn, Falls Church, and James G. Black, Jr., Springfield, Va., assignors, by mesne assignments, to Illinois Tool Works Inc., a corporation of Delaware
Filed Nov. 16, 1959, Ser. No. 853,406
18 Claims. (Cl. 198—31)

This invention relates to a feeding and loading apparatus for transferring wafers from a press to a setter tile or pallet, the wafers during their travel being manipulated so they will be delivered and arranged in a plurality of rows on a setter tile prior to its introduction into an oven.

A primary object of the invention is the provision of an apparatus which will transfer ceramic wafers from their source, i.e. a press, to a setter tile in which they are subjected to a curing heat in a suitable oven, the transfer of the wafers being primarily by gravity with suitable controls essential to the appropriate delivery of the wafers for heat treatment.

Another object of the invention is the provision of means for removing flash from the wafers after they are ejected from the press mechanism, the flash removing unit permitting the handling of more than a single lane of wafers and including a structure which will handle the dust accumulation from the removal of the flash so that the mechanism cannot be clogged or otherwise rendered inoperative.

A further object of the invention is the provision of means for feeding and synchronizing the feeding of the wafers from an initial multiple discharge in the flash removing apparatus to a single gravity chute, the wafers being fed chronologically to prevent jamming in the single lane gravity feed chute.

A further feature of the invention embodies a structure in which a pair of gate bars are constructed and arranged for receiving from the gravity chute a predetermined number of aligned ceramic wafers in parallel rows, the gate bars unloading the accumulated wafers onto a setter tile by a mechanism of such a character that the unloading of the ceramic wafers from the gate bars onto the setter tile may be successfully accomplished by gravity without disturbing the arrangement of the rows or the alignment of the wafers during their transfer.

Other objects of the invention comprehend the disabling of the gravity feed of the main gravity chute intermittently and in synchronized relation to the unloading of the ceramic wafers from the gate bars to the setter tile; the automatic control and unloading of the upper portion of the gravity chute to prevent jamming of the wafers in the chute; an arrangement to permit accumulation of a predetermined number of wafers in the main gravity chute before the operation of the disabling mechanism or unloader to insure travel of the wafers on the gate bars and the deposit of such wafers on the setter tile; and the provision of electrical means for synchronizing the feeding of the wafers to and through the gravity chute to the guide rails and onto the setter tile with means associated with the feeding of the setter tile, whereby the latter will be appropriately positioned for receiving a predetermined row of wafer elements in accordance with the capacity of the feeding apparatus.

Figure 2:
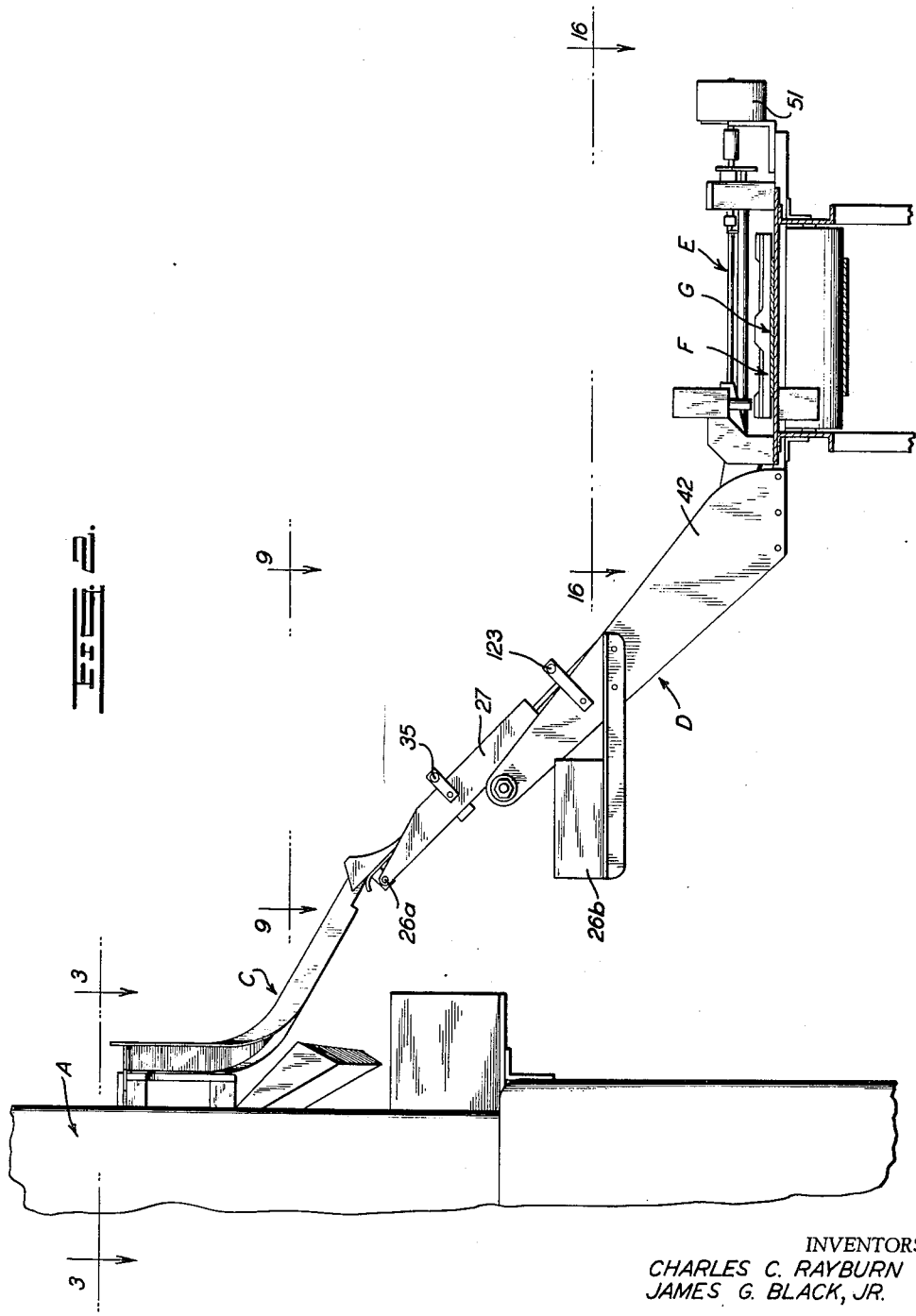
Figure 18:
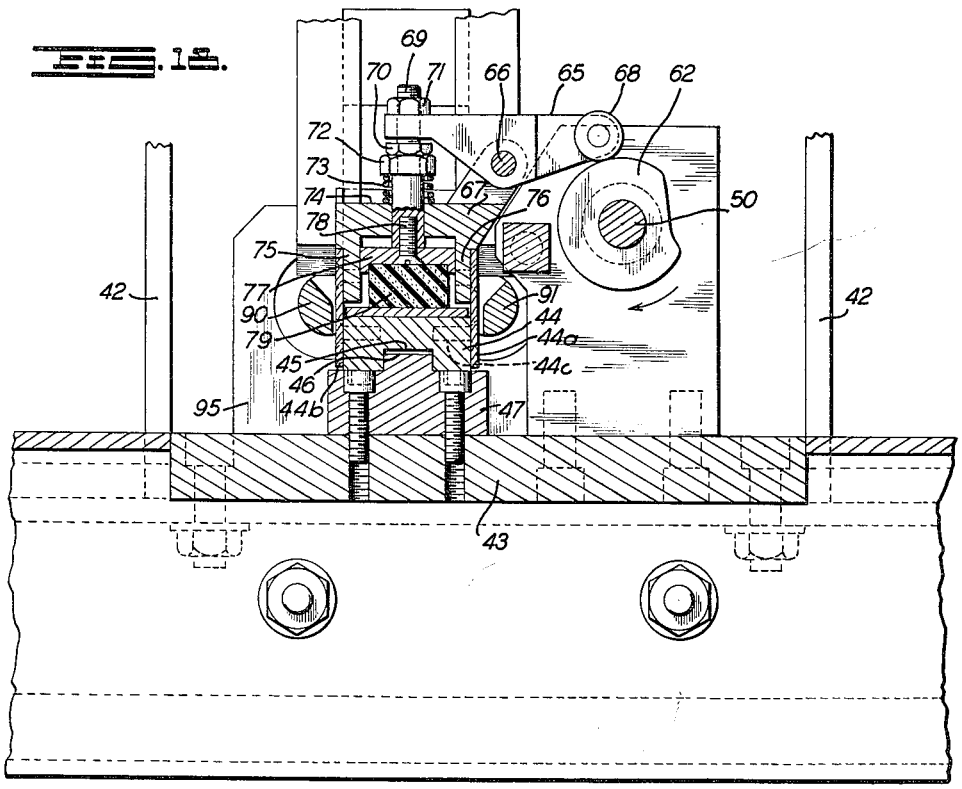
Figure 19:
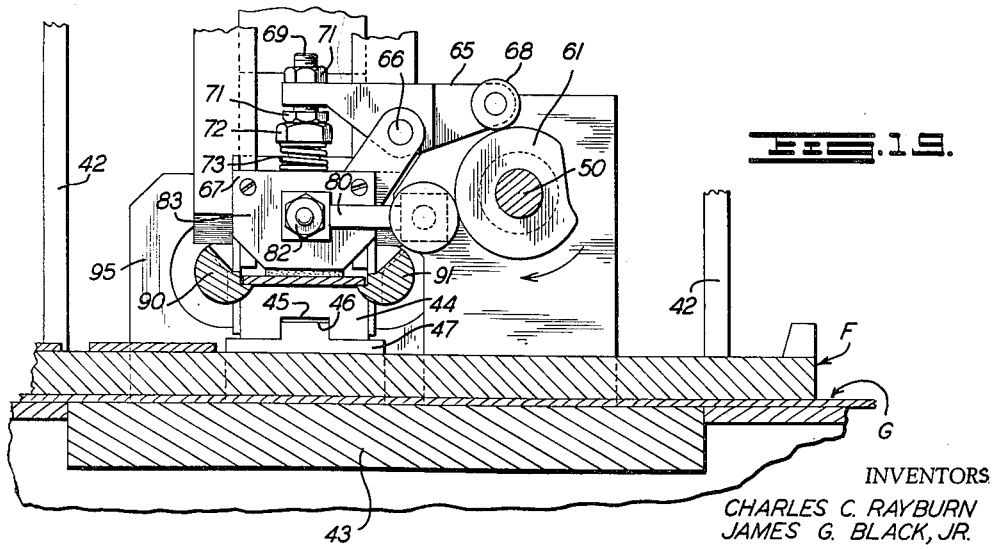
Figure 24:
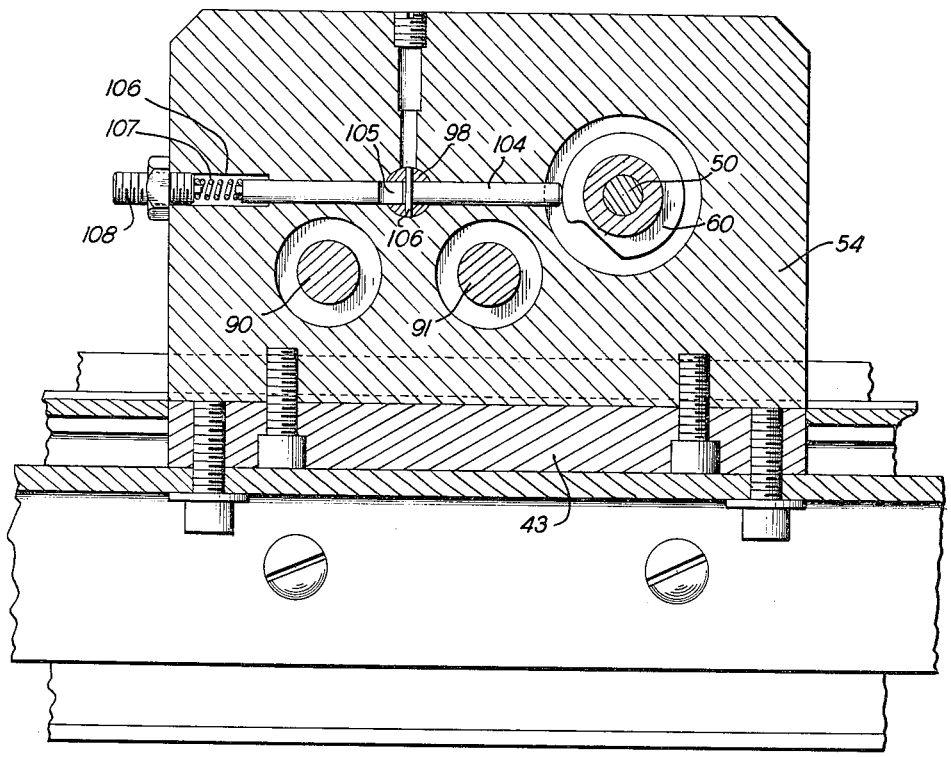
Figure 25:
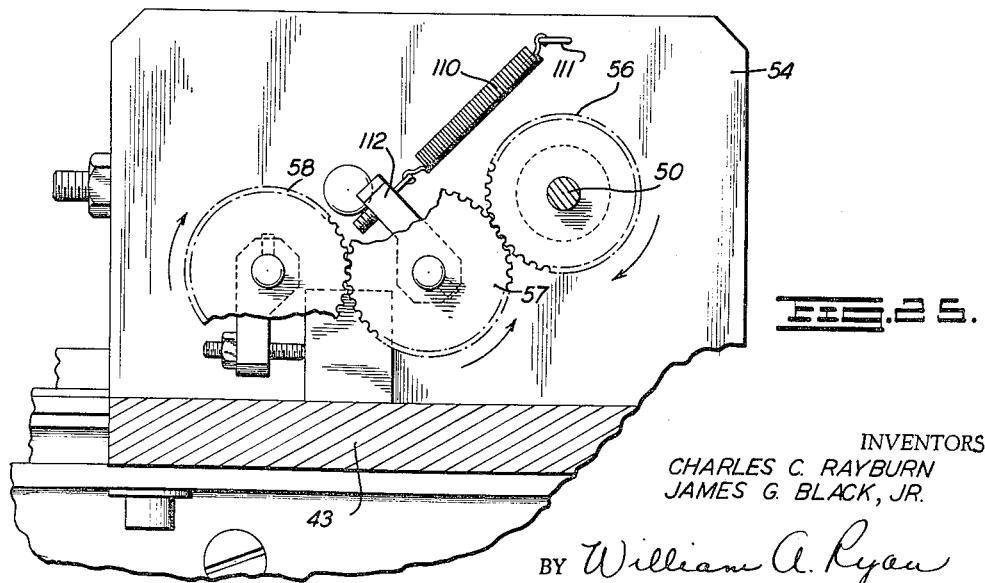
Figure 28A:
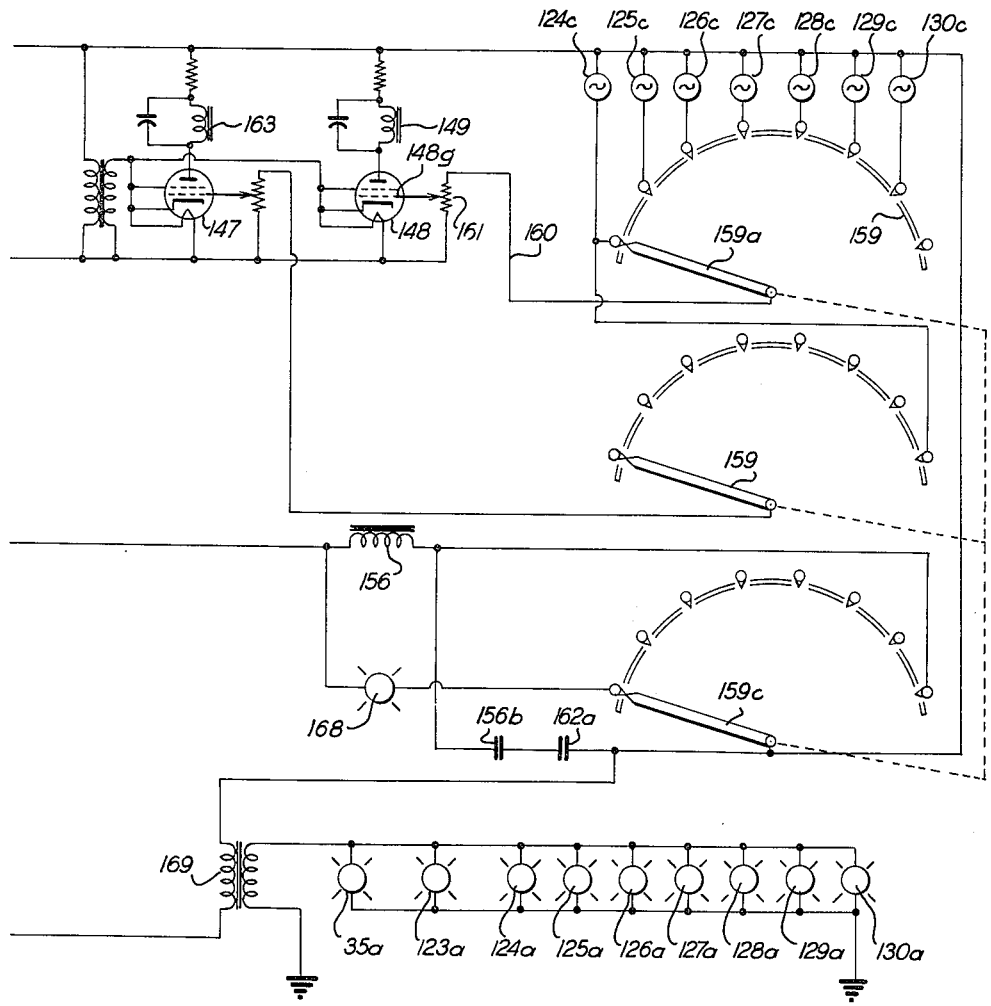

These and other objects of the invention will more clearly hereinafter appear by reference to the accompanying drawings forming a part of the instant specification, wherein like characters of reference designate corresponding parts throughout the several views, in which:

FIG. 1 is a top plan view of the apparatus;
FIG. 2 is a side elevation of the assembly shown in FIG. 1;
FIG. 3 is an enlarged section on line 3—3 of FIG. 2;
FIG. 4 is a section on line 4—4 of FIG. 3;
FIG. 5 is a section on line 5—5 of FIG. 3;
FIG. 6 is a section on line 6—6 of FIG. 5;
FIG. 7 is a side elevation partly in section showing the transfer chute delivering the wafers from the flash removal unit;
FIG. 8 is a section on line 8—8 of FIG. 5;
FIG. 9 is a top plan view of the transfer chute as viewed on dine 9—9 of FIG. 2;
FIG. 10 is an enlarged section on line 10—10 of FIG. 9;
FIG. 11 is an enlarged section on line 11—11 of FIG. 10;
FIG. 12 is an enlarged detailed fragmentary view on line 12—12 of FIG. 9;
FIG. 13 is a top plan view of FIG. 12;
FIG. 14 is an enlarged transverse sectional view on line 14—14 of FIG. 13;
FIG. 15 is a transverse sectional view on line 15—15 of FIG. 13;
FIG. 16 is a top plan view of the unloading mechanism as viewed on line 16—16 of FIG. 2;
FIG. 17 is an enlarged fragmentary view on line 17—17 of FIG. 16;
FIG. 18 is a transverse section on line 18—18 of FIG. 17;
FIG. 19 is a transverse section on line 19—19 of FIG. 17;
FIG. 20 is an enlarged fragmentary sectional view on line 20—20 of FIG. 16;
FIG. 21 is a transverse section on line 21—21 of FIG. 17;
FIG. 22 is a horizontal section taken on line 22—22 of FIG. 17;
FIG. 23 is a longitudinal section on line 23—23 of FIG. 20;
FIG. 24 is a vertical sectional view on line 24—24 of FIG. 20;
FIG. 25 is a vertical sectional view on line 25—25 of FIG. 20;
FIG. 26 is a fragmentary section on line 26—26 of FIG. 17;
FIG. 27 is a similar view showing the pallet guide rails in unloaded position; and
FIGS. 28 and 28a are diagrammatic views showing the electrical circuitry for the entire system.

The operation involved in the present invention embodies several steps. The ceramic wafers are delivered from a press A to a flash removing assembly generally indicated at B. The wafers are urged through the flash removing assembly B for delivery to a transfer chute C which feeds the wafers by gravity onto a loading track D, the loading track transferring the wafers by gravity to an unloading mechanism E where the wafers are deposited onto the setter tile F carried by the endless belt G for transfer to a heat treating apparatus.

In the drawings the wafer press assembly A is provided with a reciprocating shoe 1 which travels on a base 2 to urge the tile 3 forwardly between the lower flash removal plate 4 and the upper flash removal plate 5. The lower flash removal plate 4 is mounted on brackets 6, as best shown in FIGS. 5 and 6, while the upper flash removal plate 5 floats on the ceramic wafers traveling across the lower plate 4. Interposed between the lateral edges of the plates 4 and 5 are the guide rails 7, 8 and 8ª which are of less thickness than the ceramic wafers so that the upper flash removal plate 5 will normally contact and operate upon the upper surface of the wafers moving therebeneath. The upper plate 5 has a sheared lower inner end 9 to facilitate the entry of the wafers between the flash removal plates 4 and 5, while the outer ends of both of the plates terminate in such a position that a predetermined number of wafers may be located therebetween for movement to the transfer chute C, as shown in FIG. 5. Both the upper and lower flash removal plates are provided with a multiplicity of transverse diagonal slots 11 which form shear faces providing necessary cutting edges for the removal of flash from the wafers.

It will be noted that the flash removal assembly accommodates two rows of wafers which are separated by the intermediate guide 8a, this intermediate guide being of the same thickness as the lateral guide rails 7 and 8 so that proper cleaning action may be had between the walls of the angular slots in the plates 4 and 5 and the wafers for removing the flash from the latter. The movement of the two rows of wafers by the reciprocating shoe 1 through the flash removal plates 4 and 5 causes the delivery of the wafers to the transfer chute C, the arrangement of this transfer chute being best shown in FIG. 7 where it will be noted that the chute includes superimposed upper and lower downwardly inclined plates 12 and 14, respectively. The downwardly inclined plates 12 and 14 are provided with lateral side walls 15 and 16 and their upper ends are so located that the ceramic wafers 17 and 18 are positioned for gravity discharge thereto by virtue of the restricted supporting areas 20 and 21 which are not sufficiently wide to support the wafers, but permit the wafers to drop onto the inclined plates as indicated.

Obviously the delivery of a pair of ceramic wafers simultaneously to the upper and lower inclined plates 12 and 14 would result in a stacking of the wafers at the termination of the upper inclined plate 12 at 22 and to eliminate such stacking and to synchronize the alternate delivery of such wafers onto the lower inclined plate 14, a stop 23 is provided. The stop 23 is operated by the solenoid 24, as shown in FIG. 7. The solenoid 24 is connected in circuit with the movement of the reciprocating shoe 1. It is to be noted that the feeding of the wafers by the shoe 1 is at intervals, this shoe delivering a pair of wafers in a parallel plane at intervals after their formation by the press. It is to alternate the positioning of the wafers on the lower inclined plate 14 that the stop 23 is provided and by this means the wafers are fed and delivered by the lower inclined plate 14 to the loading track D.

The loading track D is mounted for intermittent movement in the direction of its length by mechanism to be hereinafter described for the purpose of separating the track and ceramic wafers at their point of association with the unloader mechanism. The loading track D includes a pair of horizontally arranged guide rails 24, shown in FIG. 21, these guide rails being formed with inwardly facing recesses 25 defined by spaced upper and lower flanges 24a for receiving the lateral marginal edges of the ceramic wafers. The recesses 25 are of such a dimension and are so spaced that the marginal edges of the ceramic wafers are free to travel therealong by gravity. The lateral outer faces of the upper ends of the guide rails are secured to the inner faces of the spaced vertical plates 27 by fasteners 27a and extend upwardly to a point adjacent the lower end of the transfer chute C. The upper flange of the pair of flanges 24a defining the recesses 25 terminates immediately adjacent the lower end of the hinged gate 26 of a funnel-like receiver so that this gate 26 is in the plane of the upper face of the lower flange 24a.

The funnel-like receiver includes the bottom hinged gate 26 which is mounted on a transversely positioned hinge rod or shaft 26a by the depending yoke 26b, this yoke being fixedly secured to the bottom of the hinged gate 26 and having its legs perforated to receive therethrough the medial portion of the hinge rod 26a. The yoke 26b is fixedly secured to the rod 26a by the set screws 26c. The ends of the rod 26a are journaled at 26d in the side plates 27 for rocking motion by means of an arm and link connection. This arm and link connection comprises the bifurcated arm 28 fixed to the outwardly projecting end of the rod 26a. One end of a link 29 is pivoted by pivot pin 28a between the arms 28. The opposite end of the link 29 is connected with a solenoid 30 for operation from a suitable power source as will be more fully hereinafter described.

The hinged gate 26 has a downwardly flared upper extremity 31 to facilitate the entrance of the wafers to the guide tracks 24. A cover plate 32 is positioned above the hinged gate and is flared upwardly at its upper end 33 as shown in FIG. 12. The cover plate 32 includes laterally flaring side walls 33a which extend beyond the lower side walls of the transfer chute C. The side walls 33a are fixed to the upper inner faces of the upper extensions of the guide rails 24, as shown in FIG. 15. By this construction the funnel provides ample means for delivering the ceramic wafers from the transfer chute C to a position within the longitudinally inwardly facing recesses 25 defined by the flanges 24a of the guide rails 24. It will be noted that the hinged gate 26 is formed with a centrally located bifurcation at 34 to permit the discharge of waste material. A sensing means, such as a selenium cell 35, is located at the upper end portion of the inwardly facing recesses 25, this sensing means being actuated by a light source 35a and functions to operate the solenoid actuating the hinged gate 26, as will be more clearly hereinafter described. The guide rails 24 and the upper funnel assembly are mounted on side plates 27 which retain these parts in their relatively associated positions to facilitate the travel of the ceramic wafers from the transfer chute. These side plates 27 rest in grooves in a transversely arranged roller 41 mounted at the upper end of the side panels 42 fixed to the base frame 43.

The loading track has fixed to its bottom surface at its lower end an upper bearing block 44, the bearing block 44 and the loading tracks 25 being connected by the side plates 44a and 44b by fasteners 44c. The side plates 44a extend a substantial distance along the tracks to form a rigid structure. This upper bearing block 44 is longitudinally centrally recessed at its bottom surface as indicated at 45 for engagement with the rail 46 of the base bearing member 47, as shown in FIGS. 17, 18 and 19. This bearing assembly 44–46 not only forms a trackway for the movement of the loading track but also operates as a supporting base to facilitate the operation of a downwardly acting stop member to be hereinafter described.

Mounted on the base frame member 43 is a drive shaft 50 actuated by a rotary solenoid 51. The rear end of the shaft 50 is mounted in bearings at 52 and 53 located in a standard 54 supported on the base 43. The shaft 50 is connected to the power source 51 by a coupling 55 and adjacent the coupling 55 is provided a gear 56 for operating the unloader mechanism hereinafter to be described, through gears 57 and 58. The shaft 50 is provided with a cam 60 located in the standard 54 between the bearings 52 and 53, an intermediate cam 61, and an end cam structure 62, the cams 61 and 62 being fixed to the shaft 50 by the set screws 63, as shown in FIG. 22. The cam 62 is provided with a suitable contour for operating the rocker arm 65 pivoted at 66 on the housing 67 mounted on side plate 44a and 44b. The rocker arm 65 is provided with a roller 68 for engagement with the cam surface. The free end of the rocker arm 65 actuates a threaded stud member 69 which is adjustably fixed thereto by adjusting screws 70 and 71. The stud member 69 is provided with an adjusting screw 72 for regulating the tension of a spring 73 located therebelow and seated on the top 74 of the housing 67. The housing 67 is provided with a pair of depending side walls 75 and 76 between which is located a stop member which is fixed to the bottom of the stud 69, the stop member including a base plate 77 which is secured to the stud by the screws 78 and a rubber cushion or pad 79 which is affixed thereto by adhesive or otherwise. The pad 79 is adapted to be urged downwardly by the cam 62 into engagement with a ceramic wafer at a point immediately adjacent the unloader mechanism and more specifically immediately adjacent the ends of the unloader rails to be hereinafter described and shown in detail in FIGS. 26 and 27.

The cam 61, which is the intermediate cam on shaft 50 shown in FIGS. 22 and 23, actuates a rocker arm 80, which rocker arm is provided at its free end with a threaded stud 81 and an adjusting nut 82. The stud is provided at its free end with a pusher plate 83 which abuts against the adjacent face of the stop assembly, as shown in FIG. 17, to move the stop assembly which is fixed to the loading track and therefore to move the loading track in the direction of its length for separating the same and the ceramic wafers clamped by the stop member 77 away from the rails to permit operation of these loading rails without interference with the clamp assembly and the ceramic wafers flowing by gravity downwardly in the loading track. As previously stated, the loading track is supported for longitudinal movement in the direction of its length on the rollers 41 and is free to travel a sufficient distance to clear the abutting ceramic wafers at a point adjacent the ends of the unloading rails, as best shown in FIG. 17, in which figure the separation of the wafers in the loading track and the unloading mechanism is clearly illustrated.

The unloading mechanism generally indicated by reference character E primarily embodies the use of a pair of parallel spaced horizontally arranged gate bars 90 and 91, as shown in section in FIGS. 26 and 27. These gate bars 90 and 91 are generally of rod form and have their inner faces grooved to define longitudinal guideways of right angle form as shown at 92, the base of the angle providing a support for the wafer while the other leg of the angle forms a guideway. In loading position the supporting face of the angle is generally horizontal and the guide face is generally vertical, however, when these gate bars are rotated reversely and inwardly the supporting faces of a pair of bars are moved to an unloading downwardly and inwardly inclined position, the movement during operation being sufficient to permit the clearance and movement by gravity of the wafer onto the setter tile F which is normally positioned therebelow and which is supported on a traveling belt G which travels across and is supported beneath the unloading mechanism by the base frame 43. The gate bars 90 and 91 are mounted at their driven ends in the block 54 and are reversely rotated about their axes by the meshing gears 57 and 58 through spur gear 56 on the drive shaft 50, as shown in FIG. 23. The other ends of the gate bars are mounted in bearings 94 mounted in blocks 95 fixed by studs 95a on the base frame 43, as shown in FIG. 17. The supporting shoulders 92 in the inner faces of the gate bars extend beyond each lateral edge of the setter tile F (FIG. 16) which is positioned therebelow on the belt G. The movement of the ceramic wafers by gravity from the loading track 24 to the outer marginal edge of the setter tile is provided by the weight of the wafers in the loading track and the movement of the wafers terminates at the stop 96. The flat stop 96 is provided with a shank 96a which is received in an axial socket 97 in an outwardly spring urged slide rod 98. The slide rod 98 is provided with an annular shoulder 99 against which one end of a coil spring 100 abuts. The opposite end of the spring 100 abuts against the adjacent face 101 of the rigid block 54. The slide rod 98 is shown as extending through the block 54.

Medially of the sliding rod 98 is formed a transverse slot 102 which intersects the axial socket 97, as shown in FIG. 23, and through the slot 102 a rod 104 extends, as shown in FIG. 24. This rod 104 is provided on one lateral face with a cam surface 105 (FIG. 23) at its point of intersection with the socket 97 in slide rod 98, the cam surface engaging a pin 106 fixed in the passageway 102 by virtue of the action of spring 100. The slide rod 104 has one end abutting the cam 60 on drive shaft 50 and the other end operating within a socket 106 in which is located a spring 107. The end of the slide rod 104 abuts one end of the spring which is adjustable by the threaded bolt 108 and is normally urged against the cam face. By this means the slide rod 104 moves the lateral cam surface 105 against the transversely extending pin 106 to cause the slide rod 98 to reciprocate against the tension of spring 100. The stop member 96 is thus moved intermittently by cam 60, push rod 104, and cam surface 105 into engagement with the adjacent end of the wafers carried between the gate bars 90 and 91. The spring 98 retracts the stop 96 from engagement with the wafers intermittently when the latter are to be moved to the position shown in FIG. 27 for unloading purposes. The gate bars 90 and 91 with their meshing gears 57 and 58 are partially rotated for unloading by the rotary solenoid 51 (FIG. 23) through the gear 56 and when the solenoid 51 is de-energized the spring 110 which is fixed to the block 54 at its outer end by the hook 111 and is connected to the rocker arm 112 fixed to the inner gate bar immediately adjacent its gear 57 returns the gate bars to their normal wafer-receiving position, in which position the shoulders 92 are substantially horizontal.

The operation of the stop 96 by the cam 60 is synchronized with the movement of the reciprocating pusher 83 operated by the cam 61 so that a series of contacting wafers mounted between a pair of gate bars may be simultaneously released by the stop members at each end immediately prior to the unloading of the gate members onto the setter tile.

The setter tiles are transported transversely to a row of wafers held in the unloading mechanism by coaction with a conveyor belt 118 (FIG. 1). A coordinated intermittent translation of this belt, and thus of the setter tile, is required, first in short steps to properly space adjacent rows of wafers as they are dropped onto the tile, and second in longer steps of continuous motion to carry out the fully loaded tile while advancing a new empty tile into position for reception of the first row of wafers. Driving means for the belt 118 is provided by motor 119 connected through suitable speed reducing gears 120 and shaft 121 to driving drum 122.

The speed of operation of the loader is generally sufficient to handle the full output rate of the wafer forming press A. If for some reason the loader does not take care of the full output of the press, photo-electric sensing device 35 causes the dumping gate 26 to discharge the wafers into a storage bin 26b so as not to jam the machine. On the other hand, when an insufficient supply of wafers is available on track D, the loader is stopped through photosensitive device 123 (FIG. 2) until the necessary stockpile level is attained.

Photosensitive detectors are also employed to control the translation and indexing of the setter tiles on belt 118. The preferred embodiment of this invention provides seven rows of wafers on each platen; seven short translatory steps and stops are required; accordingly, seven photosensitive indexing detectors 124, 125, 126, 127, 128, 129 and 130 (FIG. 16) are provided. As the tile advances, a light beam sharply defined by slots such as 129s and 130s, is intercepted by the forward edge of the opaque setter tile. Through circuitry to be described, this cut-off of light stops the tile in proper position to receive a new row of wafers.

A suitable control circuit for accomplishing the coordinated actional sequence described above is shown in FIGS. 28 and 28a. The actuattion motors and solenoids, which have already been mentioned, are drawn in rectangular enclosures for clarity: de-jamming solenoid 30; loading solenoid 51 and belt drive motor 119. Power for these actuators is provided from a three phase alternating current source 131, through triple pole, single throw switch 132. Drive motor 119 is of a reversible three phase type and accordingly is energized through three lines 133, three relay contacts 134a for forward operation, of 135a for reverse operation. The other actuators as well as their associated control circuitry operate on single phase power and accordingly are supplied from one phase of source 131 through switch 136 and line 137, through relay contact 138ᵃ to the de-jammer solenoid 30, or through relay contact 139ᵃ for loading solenoid 51. Loading solenoid 51 is of the direct current type and accordingly a rectifier bridge 140 is inserted across the A.C. source in its supply line.

Although nine photosensitive detectors are employed, only four amplifier circuits for the relays which they control are required. An indexing switch permits a single amplifier successively to serve each of the seven indexing photocells. Each of the four amplifier circuits are essentially identical (i.e. circuits associated with tubes 146, 141, 147 and 148) so that a description of one will apply to all. In particular, the de-jamming element 35ᶜ is a selenium cell in which the resistance decreases as light is applied. Cathode 141ᶜ of tube 141 has a positive potential impressed through transformer 142 on positive half cycles of the A.C. source. When the resistance of cell 35ᶜ is high the corresponding positive excursions of grid 141ᵍ remain sufficiently below that of the cathode to keep the tube cut off and relay coil 138 deenergized. However, when the resistance of cell 35ᶜ is decreased, as by opening up the light from source 35ᵃ as the machine becomes unjammed, the positive excursions of the grid 141ᵍ are sufficient to cause conduction to anode 141ᵃ, and thus to energize relay 138. Relay actuation is stabilized by capacitor 143 and plate current is limited by resistance 144 in addition to the internal resistance of relay coil 138. Cathode heating element 141ʰ is energized by connection between cathode 141ᶜ and ground 131ᵍ. The sensitivity of circuit is adjustable by means of potential divider 145.

The operation of the control circuits, FIGS. 28 and 28a, will follow a pattern now to be described. The loader is turned on by closing switches 132 and 136. After a warm-up period for photo-amplifier tubes 146, 141, 147 and 148, relay 149 is energized since indexing slit 124ᵃ is open in the absence of a setter tile. Normally closed (N.C.) contact 149ᵃ opens and normally open (N.O.) contact 149ᵇ closes.

Operation commences with manual actuation of starting switch 150, connecting power from line 137, through limit switch 151 to relay coil 152 and thence to ground 131ᵍ. N.O. contact 152ᵃ closes to hold on relay 152 after start switch 150 is released. The belt drive motor 119 will then be energized in the forward direction through contacts 134ᵃ. Relay 134 is energized through the N.C. interlocking contact 135ᵇ of relay 135, contact 149ᵇ and N.O. contact 152ᵇ. The N.O. zero speed switch 154 closes as soon as motor 119 starts.

A setter tile placed on the conveyor belt 118 will continue to move forward until it covers light source 124ᵃ. Relay 149 is deenergized (in the manner previously described by way of example for relay 138), N.O. contact 149ᵇ opens to deenergize relay 134 which closes interlocking contact relay 134ᵇ and opens contact 134ᵃ to remove the power from motor 119. Relay 135 will then be energized through the zero speed switch 154, causing momentary reversal of motor 119 through contacts 135ᵃ, effectively braking it. When zero speed is reached, switch 154 opens, deenergizing relay 135 and thus removing the power from motor 119.

With the setter tile coming to rest in position for unloading of a row of wafers already set up in gate bars 90 and 91, the loader solenoid 51 is energized by energization of relay 139 through N.C. contacts of control relay 155ᵃ (assuming wafer supply to be adequate), N.C. contact 149ᵃ of the indexing relay 149, and N.C. contact 156ᵃ. A counter 157 which tallies the number of rows which are loaded, is also energized with the closing of contacts 139ᵃ.

Relay 139 has one set of contacts 139TC which can be set to close a preset time after energization of relay 139. When this occurs indexing coil 157, energized with D.C. through rectifier bridge 158, advanced the ganged arms of stepping switch 159. The grid 148ᵍ, which had been previously connected through voltage divider 161, line 160, switch arm 159ᵃ, to photocell 124ᶜ, is now connected to photocell 125ᶜ, corresponding to the next indexing position for the setter tile. With connection to an illuminated photocell 125ᶜ relay 149 again becomes deenergized and the cycle starts anew. It is repeated successively until seven rows of wafers have been loaded.

As the setter tile advances, all photocells eventually become blocked off from the light sources. When stepping switch 159 reaches its right-most position (FIG. 28a), relay 156 is energized through arm 159ᶜ. Once energized it is held on through N.O. contact 156ᵇ and N.O. contact 162ᵃ of relay 162. N.O. relay contact 156ᶜ closes, energizing relay 134 through N.C. contact 135ᵇ, which causes the drive motor 119 to continue to run in the forward direction. The loaded setter tile then advances, until it reaches photocell 124ᶜ, unblocking it and thus causing reset amplifier 147 to energize relay 163. N.O. contact 163ᵃ closes, energizing relay 164, which is locked on through closing of N.O. contact 164ᵃ. N.O. contact 164ᵇ, energizes reset coil 165, D.C. operated through rectifier bridge 166, which resets switch 159 to the position shown in FIG. 28a. In this way, a positive return of the stepping switch to home position is provided.

As a new setter tile moves in relay 149 is deenergized as N.C. contact 149ᶜ opens, deenergizing relay 162; N.O. contact 162ᵃ opens, deenergizing relay 156; N.O. contact 156ᵇ opens. Finally, N.O. contact 156ᶜ opens causing the drive motor to stop. The cycle now repeats itself until the new tile is loaded and so on.

It will be noted that when the chute level falls sufficiently to unblock the illumination of cell 123ᶜ, tube 146 opens relay contact 155ᵃ and the loading is suspended by opening of contact 139ᵃ, through deenergization of relay 139.

On the other hand, if the chute becomes blocked or jammed, tube 141 sensing the signal from photocell 35ᶜ deenergizes relay 138 to open gate 26.

What I claim is:

1. In an article transfer apparatus, a conveyor means for holding supports for receiving the articles, means intermittently moving the supports, an unloading mechanism positioned above the conveyor means for receiving a plurality of articles and depositing the articles simultaneously on said supports, a gravity loading track for delivering the articles to said unloading mechanism, said loading track being mounted for movement towards and away from the unloading mechanism, and means for delivering articles to said loading track.

2. In an article transfer apparatus, a conveyor means for holding supports for receiving the articles, means for intermittently moving the supports, an unloading mechanism including a pair of spaced gate bars positioned above the conveyor means for receiving a plurality of articles, means for actuating the gate bars for depositing the articles simultaneously on said supports, a gravity loading track for delivering the articles to said gate bars, means for moving the loading track away from the unloading mechanism when said gate bars are actuated to deposit the articles on said supports, and means for delivering articles to said loading track.

3. In an article transfer apparatus, a conveyor means for holding supports for receiving the articles, means for intermittently moving the supports, an unloading mechanism including a pair of spaced gate bars positioned above the conveyor means for receiving a plurality of articles, means for actuating the gate bars for depositing the articles simultaneously on said supports, a gravity loading track for delivering the articles to said gate bars, means for moving the loading track away from said gate bars during actuation of the latter, and means for returning the loading track into position for delivering articles to said gate bars.

4. In an article transfer apparatus, a conveyor means for holding article supports for receiving the articles, means for intermittently moving the supports, an unloading mechanism including a pair of spaced gate bars positioned above the conveyor means for receiving a plurality of articles, means for actuating the gate bars for depositing the articles simultaneously on said article supports, a gravity loading track for delivering the articles to said gate bars, a supporting means for said gravity loading track, means mounting said gravity loading track on said supporting means for movement in the direction of the length of the loading track and in a direction toward and away from said unloading mechanism, and power means for shifting said loading track on its supporting means away from said unloading mechanism when said gate bars are actuated to discharge the articles supported thereon onto said article supports.

5. In an article transfer apparatus, a conveyor means for holding article supports for receiving the articles, means for intermittently moving the supports, an unloading mechanism including a pair of spaced gate bars positioned above the conveyor means for receiving a plurality of articles, means for actuating the gate bars for depositing the articles simultaneously on said article supports, a gravity loading track for delivering the articles to said gate bars, stop means for limiting the number of articles delivered to said gate bars, supporting means for said gravity loading track, means mounting said gravity loading track on said supporting means for movement in the direction of the length of the loading track and in a direction toward and away from said unloading mechanism, and power means for shifting said loading track on its supporting means away from said unloading mechanism when said gate bars are actuated to discharge the articles supported thereon onto said article supports.

6. In an article transfer apparatus, a conveyor means for holding article supports for receiving the articles, means for intermittently moving the supports, an unloading mechanism including a pair of spaced gate bars positioned above the conveyor means for receiving a plurality of articles, means for actuating the gate bars for depositing the articles simultaneously on said article supports, a gravity loading track for delivering the articles to said gate bars, stop means for limiting the number of articles delivered to said gate bars, supporting means for said gravity loading track, means mounting said gravity loading track on said supporting means for movement in the direction of the length of the loading track and in a direction toward and away from said unloading mechanism, and power means for shifting said loading track on its supporting means away from said unloading mechanism when said gate bars are actuated to discharge the articles supported thereon onto said article supports and simultaneously moving said stop means out of engagement with said articles.

7. In an article transfer apparatus, a conveyor means for holding article supports for receiving the articles, means for intermittently moving the supports, an unloading mechanism including a pair of spaced gate bars positioned above the conveyor means for receiving a plurality of articles, said gate bars being connected at one end by intermeshing means for simultaneous movement, power driving means, said power driving means actuating said intermeshing means to move said gate bars from loaded to unloaded position, a gravity loading track for delivering the articles to said gate bars, stop means for limiting the number of articles delivered to said gate bars, supporting means for said gravity loading track, means mounting said gravity loading track on said supporting means for movement toward and away from said unloading mechanism, and cam means actuated by said power means for shifting said loading track on its supporting means away from said unloading mechanism when the gate bars are moved to unloading position.

8. In an article transfer apparatus, a conveyor means for holding article supports for receiving the articles, means for intermittently moving the supports, an unloading mechanism including a pair of spaced gate bars positioned above the conveyor means for receiving a plurality of articles, said gate bars being connected at one end by intermeshing means for simultaneous movement, power driving means, said power driving means actuating said intermeshing means to move said gate bars from loaded to unloaded position, a gravity loading track for delivering the articles to said gate bars, retractable stop means for limiting the number of articles delivered to said gate bars, supporting means for said gravity loading track, means mounting said gravity loading track on said supporting means for movement toward and away from said unloading mechanism, and means actuated by said power means for shifting said loading track on its supporting means away from said unloading mechanism and for retracting said stop means when the gate bars are moved to unloading position.

9. In an article transfer apparatus, a conveyor means for holding article supports for receiving the articles, means for intermittently moving the supports, an unloading mechanism including a pair of spaced gate bars positioned above the conveyor means for receiving a plurality of articles, said gate bars being connected at one end by intermeshing means for simultaneous movement, power driving means, said power driving means actuating said intermeshing means to move said gate bars from loaded to unloaded position, a gravity loading track for delivering the articles to said gate bars, retractable stop means for limiting the number of articles delivered to said gate bars, supporting means for said gravity loading track, means mounting said gravity loading track on said supporting means for movement toward and away from said unloading mechanism, cam means actuated by said power means for shifting said loading track on its supporting means away from said unloading mechanism and for retracting said stop means when the gate bars are moved to unloading position, and stop means for clamping the article in said gravity loading track adjacent to the gate bars to prevent further discharge of said articles from the gate bars during movement of said gate bars to and from unloaded position.

10. In an apparatus for transferring ceramic wafers from a press for arrangement on setter tiles carried by a conveyor for heat treatment in an oven, a flash remover for treating the wafers after leaving the press, a transfer chute for receiving the ceramic wafers from the flash remover and for arranging them in a single series, a gravity loading track for receiving the wafers from the transfer chute, means mounting said gravity track for movement in the direction of its length, said loading track including a bottom wall portion provided with a hinged gate for unloading said track, automatic means for actuating said gate, an unloader mechanism including a pair of spaced gate bars for receiving the wafers from said loading track, said gate bars having inwardly facing longitudinally extending shoulders for supporting said wafers and being inwardly rotatable for unloading an accumulation of wafers from said gate bars, stop means at the outer ends of said gate bars for limiting the gravity flow of wafers from the loading track onto the gate bars, means for clamping the wafers in said loading track adjacent the gate bars for preventing the further gravity flow of wafers therealong, and power means engaging said clamp member when the latter is clamping the bottom wafer to the track for moving said track and clamp means away from the gate bars when the latter are being unloaded.

11. The structure of claim 10 characterized in that the automatic means for actuating the hinged gate in the loading track includes a selenium cell and a connection between the selenium cell and the hinged gate.

12. The structure of claim 10 characterized in that the pair of spaced gate bars in the unloader mechanism are geared together for simultaneous operation.

13. The structure of claim 10 characterized in that the stop means at the outer ends of the gate bars for limiting the gravity flow of wafers from the loading track is automatically actuated by means synchronized with the operation of the pair of spaced gate bars of the unloader mechanism.

14. The structure of claim 10 characterized in that the stop means at the outer ends of the gate bars for limiting the gravity flow of wafers from the loading track onto the gate bars is automatically actuated in synchronized relation to the means for clamping the wafers in the loading track adjacent the gate bars.

15. In an apparatus for transferring ceramic wafers from a press for arrangement on setter tiles carried by a conveyor for heat treatment in an oven, a flash remover for treating the wafers after leaving the press, a transfer chute for receiving the ceramic wafers from the flash remover and for arranging them in a single series, a gravity loading track for receiving the wafers from the transfer chute, a frame, roller means carried by said frame and supporting said track, said loading track including a bottom wall portion provided with a hinged gate for unloading said track, automatic means for actuating said gate, an unloader mechanism including a pair of spaced gate bars for receiving the wafers from said loading track, said gate bars having inwardly facing longitudinally extending shoulders for supporting said wafers and being inwardly rotatable for unloading and accumulation of wafers from said gate bars, stop means at the outer ends of said gate bars for limiting the gravity flow of wafers from the loading track onto the gate bars, means for clamping the wafers in said loading track adjacent the gate bars for preventing the further gravity flow of wafers therealong, power means, and means actuated by the power means for operating the stop means, the clamp member, and moving the track on its roller support when the gate bars are being unloaded.

16. In an unloading device for delivering articles from a source to a platen, said unloading device comprising a base structure, a pair of horizontally arranged spaced gate bars carried by said base structure, said gate bars including longitudinally extending inwardly facing supporting trackways, intermeshing gears at one end of the gate bars, a power source, a shaft driven from said power source, said shaft having its axis extending generally parallel to the axis of one of said gate bars, means on said shaft meshing with one of the gears on said gate bars for actuating the same for unloading the articles arranged on said trackways, means for returning the shaft to its normal supporting position, stop means for limiting the number of articles arranged on said trackways, means for interrupting the flow of articles from said source to said gate bars, and means carried by said power shaft for actuating the stop means and interrupting means.

17. In a transfer apparatus for articles, a source of supply for said articles, a conveyor for receiving said articles, an unloader mechanism for depositing said articles on said conveyor, said unloader including a pair of generally horizontal spaced gate bars formed to receive a series of aligned articles, a chute normally abutting said gate bars for delivering said articles thereto by gravity from said source, a stop at the lower end of said chute to interrupt the gravity flow of articles therealong, means for actuating said stop, and an unloader at the upper end of said chute for diverting articles therefrom when said stop interrupts the free flow of articles.

18. The structure of claim 17 characterized in that means are provided for shifting the chute out of engagement with the gate bars after the actuation of said stop means.

References Cited in the file of this patent
UNITED STATES PATENTS

| | | |
|---|---|---|
| 2,135,986 | Morton | Nov. 8, 1938 |
| 2,144,761 | Herold | Jan. 24, 1939 |
| 2,331,018 | Fedorchak | Oct. 5, 1943 |
| 2,371,419 | Bergmann | Mar. 13, 1945 |
| 2,603,340 | Warren | July 15, 1952 |
| 2,772,792 | Lakso | Dec. 4, 1956 |
| 2,802,560 | Engleson | Aug. 13, 1957 |
| 2,860,762 | Alexander | Nov. 18, 1958 |
| 2,889,023 | Moncrieff | June 2, 1959 |